UNITED STATES PATENT OFFICE.

ELDRIDGE J. BURCHELL, OF LA FARGEVILLE, NEW YORK.

CEMENT FOR ROOFING, &c.

SPECIFICATION forming part of Letters Patent No. 339,970, dated April 13, 1886.

Application filed July 15, 1885. Serial No. 171,709. (No specimens.)

*To all whom it may concern:*

Be it known that I, ELDRIDGE J. BURCHELL, of La Fargeville, in the county of Jefferson and State of New York, have invented a new and Improved Cement for Roofing, &c., also applicable to other purposes, of which the following is a full, clear, and exact description.

My improved cement, when used, for instance, as a covering to shingle roofs, consists of the following ingredients in or about the proportions stated, viz: Coal-tar, one barrel; water-lime, seventy-five pounds; coal-ashes, fifteen pounds; plaster-of-paris, ten pounds; oil solution, two and a half gallons; soda solution, one gallon.

Instead of the coal-ashes, when not readily obtainable, about the same proportion of ground slate or sand may be used, and such in the composition are to be regarded as equivalents of the coal-ashes.

The oil solution is made by putting two pounds of resin into one gallon of dead-oil. The oil cuts the resin, and the oil solution forms a drier, which assists in making the cement have a slaty surface of a hardness that will resist any attempt to cut it with a knife, and which will prevent the cement from cracking, as elastic paints are liable to do on exposure to heat and cold. The slaty surface, too, of the cement, and which is quickly formed, prevents water from affecting it, as well as the sun's rays or extreme cold.

The soda solution gives the cement a fire-proof character, and is made by putting three pounds of sal-soda into one gallon of water. That dissolves the soda.

To prepare and apply the cement, the coal-tar in or about the proportion of one barrel is first put into a suitably-constructed boiler, and the drying and fire-proofing solutions—that is, the oil and soda solutions in or about their specified proportions—added, and the whole allowed to boil for about one hour. While this mixture is boiling a sufficient quantity of it is taken from the boiler to nearly fill a two-gallon pail, and about four pounds, in their specific relative proportions or thereabout, of the water-lime, ashes, and plaster-of-paris added, and the whole thoroughly mixed. Such completed mixture is then applied by brush or otherwise to the roof, care being taken to apply it while hot, and so that it will not become cold or set before it properly solidifies as a cement covering to the roof.

This cement, unlike a paint, "sets" and dries quickly, and forms a solid covering, that will not part and run as elastic paints do. It will protect the shingles from swelling by rain and from contracting by cold, and will cause the roof to remain as it was laid. Its ingredients are also preservative of the material or materials to which the cement is applied. It may likewise be used as a covering and preservative of the underground portions of fence-posts or other articles or structures which penetrate the earth or enter beneath the surface of water. If necessary, the proportions of its ingredients may be more or less varied, or other ingredients added, to adapt it to different climates, and coloring-matter, if desired, of any suitable kind be added, as circumstances may suggest or require, and in which case less of the coal-tar and more of the oil solution may be used.

For tin and iron roofs, the mixture may be as follows, viz: Coal-tar, one barrel; dead-oil solution, four gallons; water-lime, twenty pounds, and plaster-of-paris, fifteen pounds, using more or less of the tar, according to the color desired.

Having thus described my invention, I claim as new and desire to secure by Letters Patent—

1. The herein-described cement for roofing and other purposes, consisting of coal-tar, water-lime, coal-ashes, plaster-of-paris, oil solution, and soda solution, in or about the proportions specified.

2. A roofing-cement in which is combined coal-tar, a dead-oil solution, water-lime, and plaster-of-paris, in or about the proportions specified.

ELDRIDGE J. BURCHELL.

Witnesses:
S. E. BURCHELL,
WM. B. FLAMSBURGH.